Figure 12:
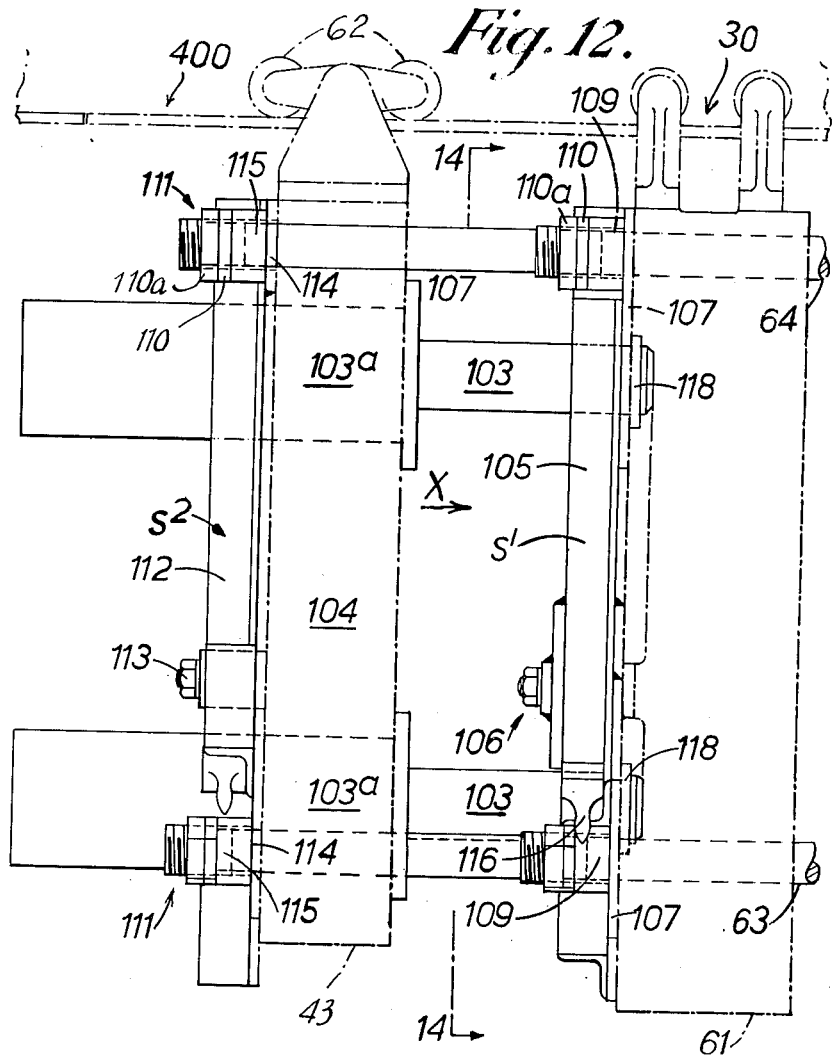

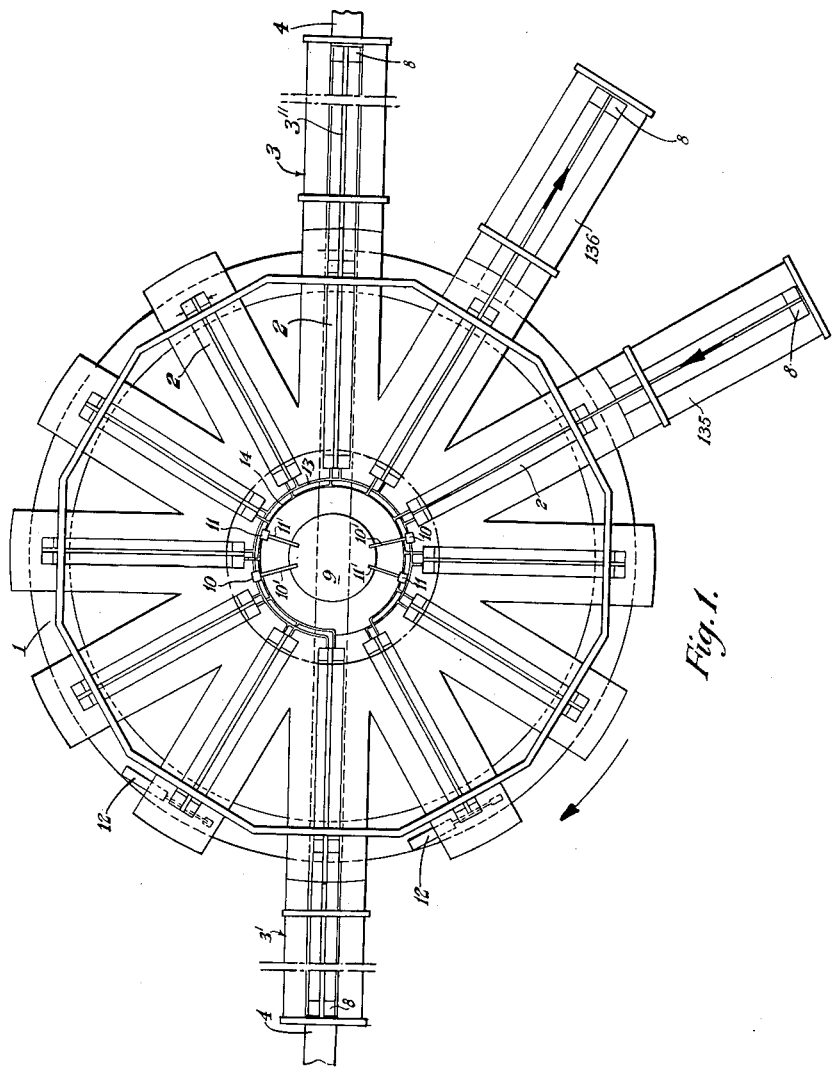

Sept. 7, 1965  G. G. J. DAVIS  3,204,769
FILTER PRESS
Filed Nov. 23, 1962  9 Sheets-Sheet 2
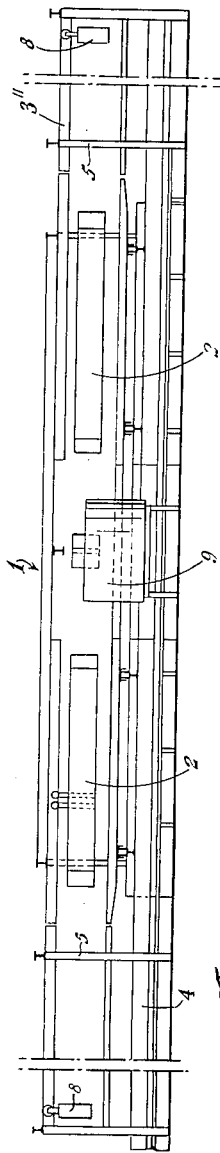
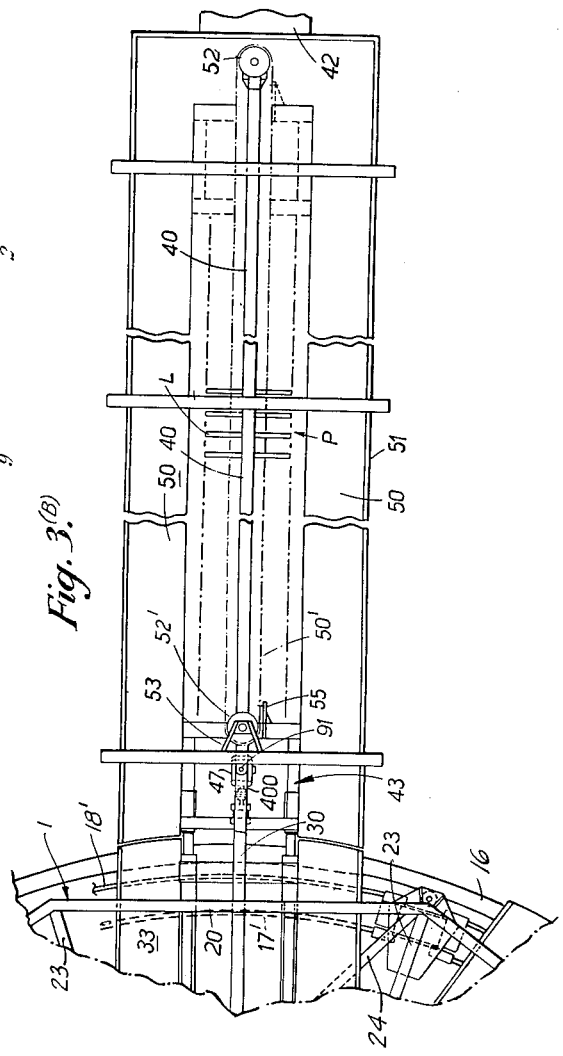
Inventor:
Geoffrey George John Davis
BY Baldwin & Wight
Attorneys

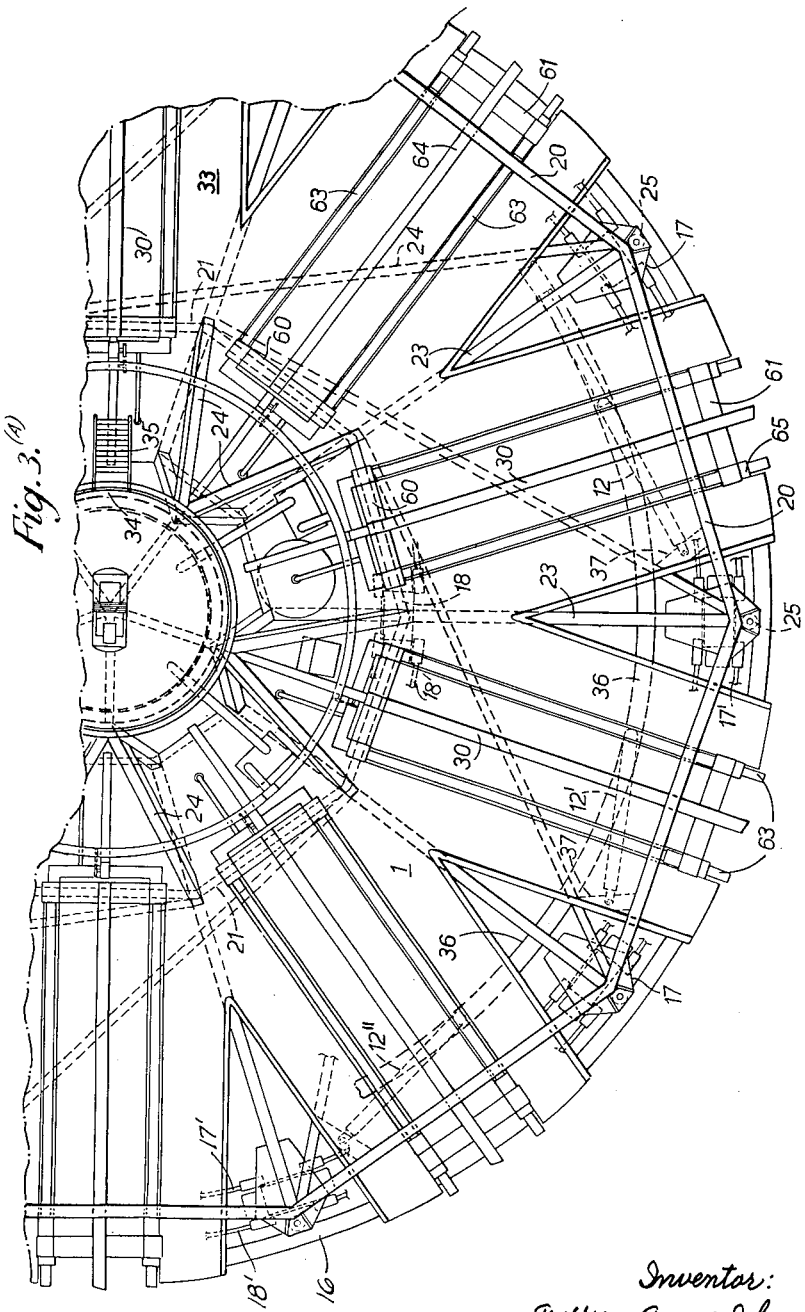

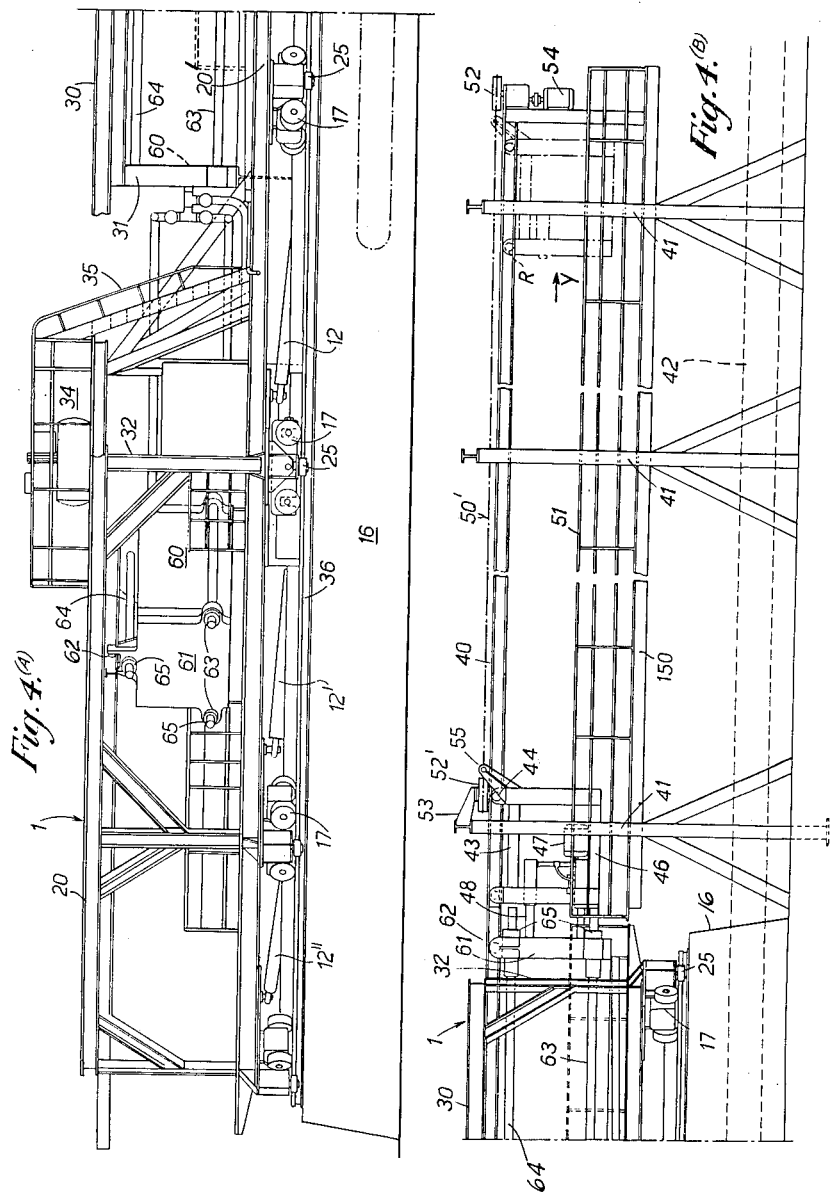

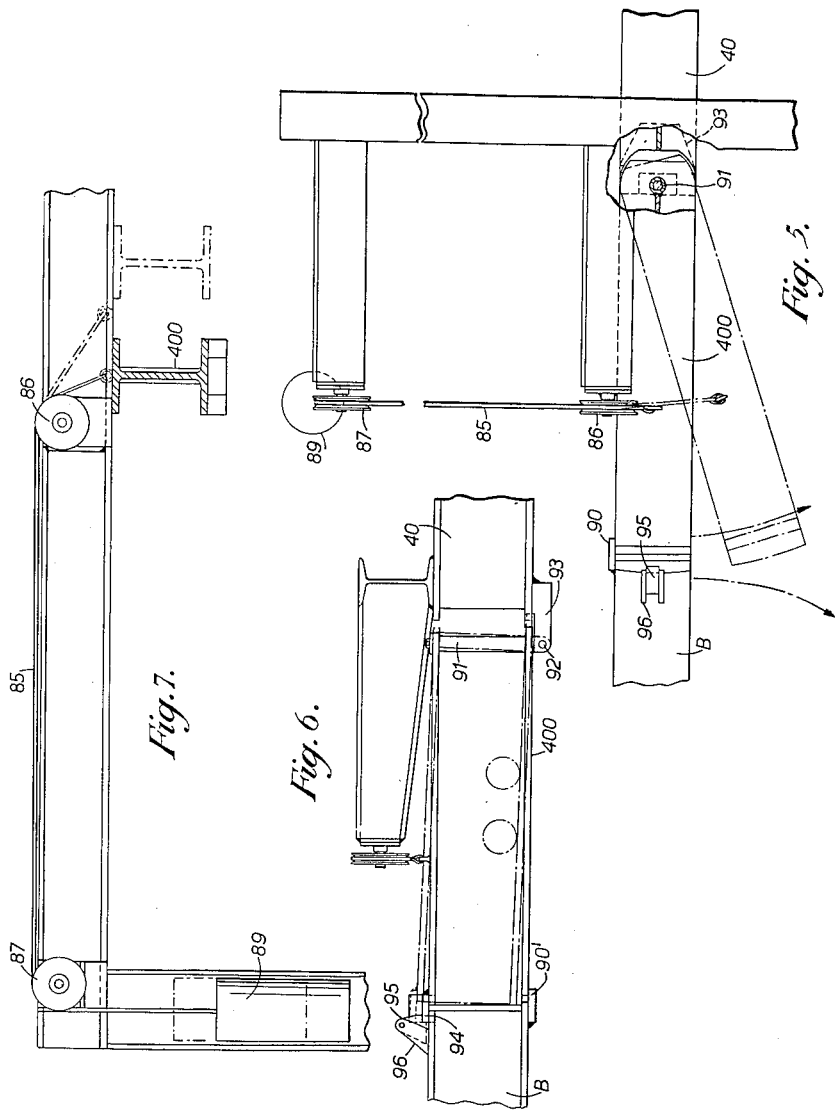

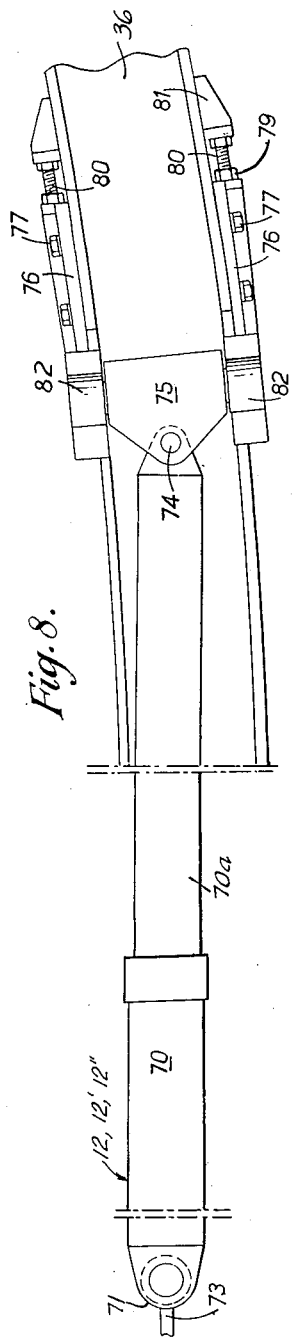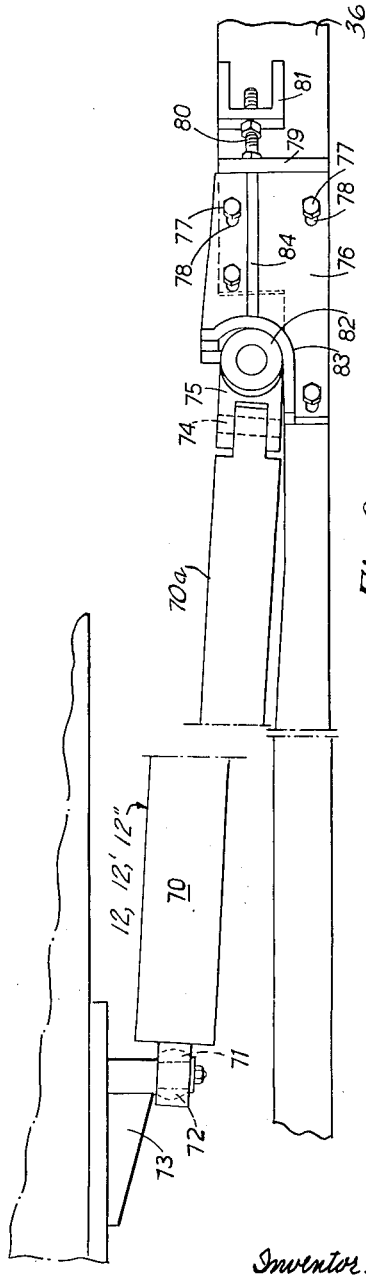

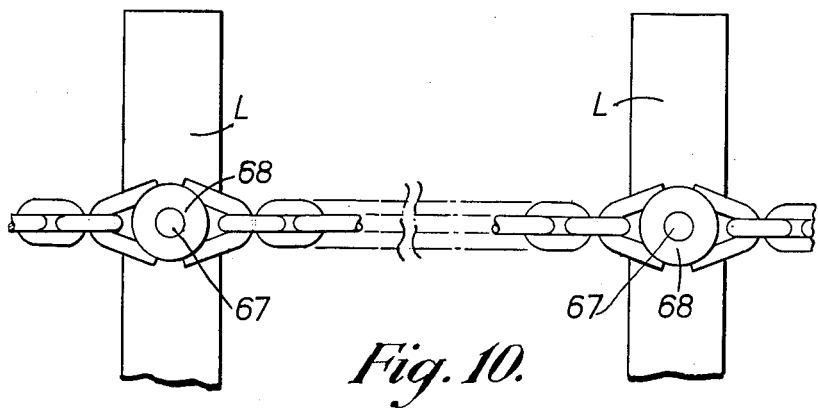
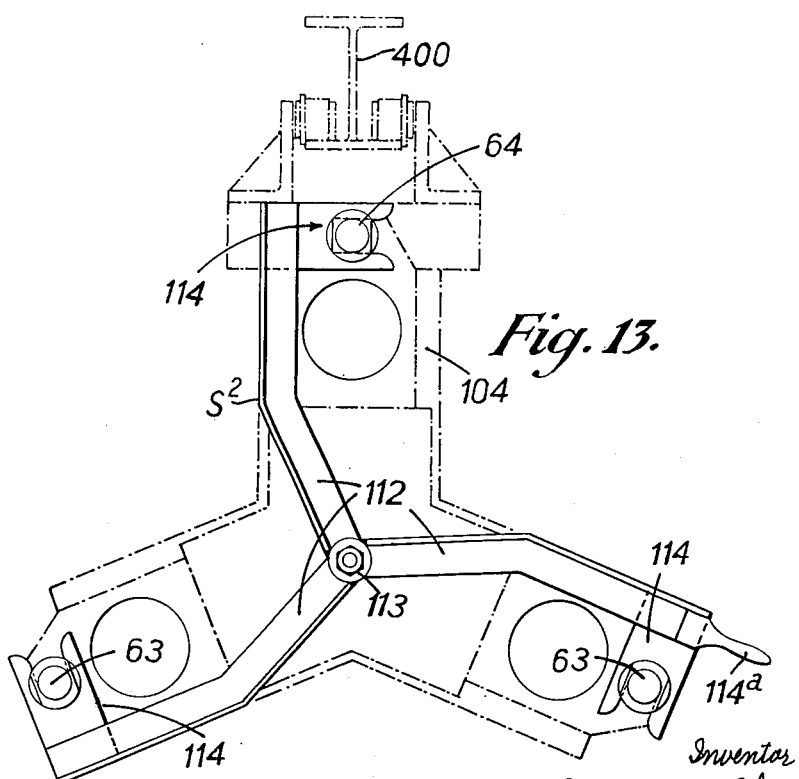

Sept. 7, 1965 G. G. J. DAVIS 3,204,769
FILTER PRESS
Filed Nov. 23, 1962 9 Sheets-Sheet 8
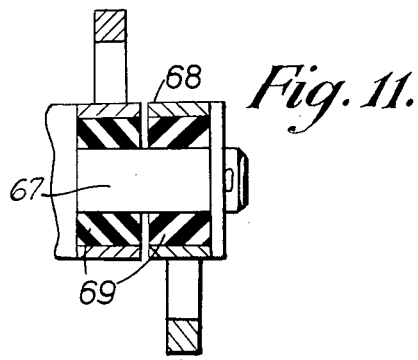
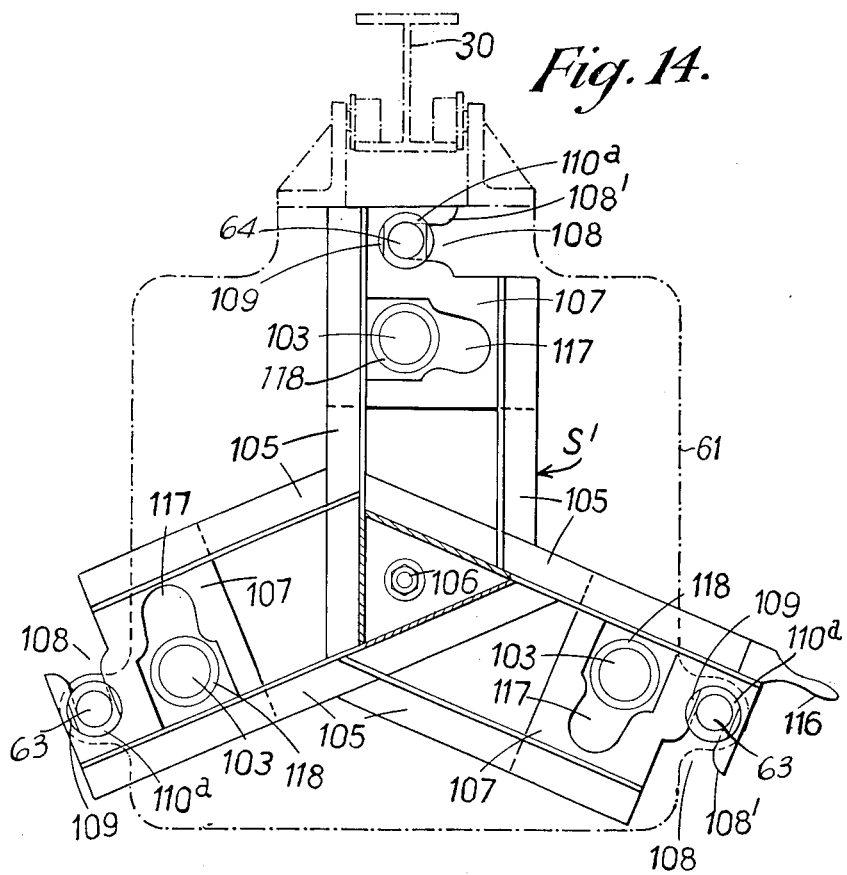
Inventor:
Geoffrey George John Davis
BY Baldwin & Wight
Attorneys Sept. 7, 1965

G. G. J. DAVIS 3,204,769

FILTER PRESS

Filed Nov. 23, 1962

9 Sheets-Sheet 9

Inventor:
Geoffrey George John Davis
BY Baldwin & Wright
Attorneys

United States Patent Office 3,204,769
Patented Sept. 7, 1965

3,204,769
FILTER PRESS
Geoffrey George John Davis, London, England, assignor to The Associated Portland Cement Manufacturers Limited, London, England, a corporation of the United Kingdom
Filed Nov. 23, 1962, Ser. No. 255,142
Claims priority, application Great Britain, Nov. 28, 1961, 42,570/61
14 Claims. (Cl. 210—230)

This invention relates to filter presses.

The present day filter press consists of a number of cloth lined chambers formed between a pack of recessed filter plates. The chambers formed between the plates are interconnected and, after clamping the series of plates in a suitable frame, material to be filtered, e.g., slurry is pumped into the chambers under pressure and the water is expelled from the slurry through the cloth lining of the chambers and passes out of the press through suitable channels. Fresh slurry is pumped into the press until all of the chambers are filled with more-or-less solid filter cake, the pack of press plates is then unclamped and the individual plates separated to allow for the removal of the semisolid filter cake.

It will be seen, therefore, that such a filter press comprises a series of plates, a support or surrounding frame, a suitable clamping device for applying pressure to the plates and a means of pumping in the slurry. In the normal type of press the surrounding frame is made of sufficient length for the plates to be moved along it, after unclamping, one at a time, thus separating adjacent plates and opening each of the chambers in turn for the discharge of the filter cake. This discharge operation is normally performed manually and, in a large press, requires considerable physical effort and an extended period of time. To overcome this difficulty an improved method of emptying a press has been devised and is the subject of the present invention.

According to this invention, there is provided an extended runway forming a prolongation of the frame of a filter press unit and on to which the filter press plates from one of a number of associated filter press units can be withdrawn after unclamping, either the filter press units or the runway extension being mounted for movement one relative to the other in order to bring the press unit to be discharged into position opposite the runway while the other press units are being charged and processed.

By suitably connecting the plates in a pack by short links, the whole or greater part of the pack can be opened out on the runway extension with the plates spaced at a distance corresponding to the length of the links. In this condition, the whole pack of plates is opened for the discharge of filter cake and for inspection of the filter cloths. The closing operation takes place in reverse and the pack of plates will be closed up and pushed into position within the side frames and clamped there by a single clamping means provided.

Since there are practical limits to the physical dimensions of a single filter press, the tonnages normally handled by the cement industry call for filter press installations consisting of considerable numbers of presses. Installations of this sort, with the corresponding numbers of slurry pumps, conveyors, etc., not only become very high in capital cost but also very expensive in operation, and it is to overcome these high costs that the filter press of this invention has been designed.

Filter press apparatus according to the invention comprises a rotary press having a series of filter press units supported on a turntable and on which they are arranged radially in relation to a central supply point for slurry, at least one runway extension on to and off which the plates of each press unit can be drawn for discharge of filter cake, means for imparting movement to the turntable to advance individual press units into a position opposite the runway extension, the length of which extension is sufficient to permit the plates, when positioned thereon, to be separated to permit discharge of the filter cake, and means on the runway extension by which the plates can be drawn off the press and returned thereto.

Collecting of the filter cake is by means of a conveyor which is positioned beneath the runway to receive the filter cake from the press unit or units being discharged.

The apparatus of this invention has the advantage that it is only necessary to use one filter cake conveyor which is disposed underneath the discharging station. It is also possible to reduce the number of filter press opening and closing devices and effect economies in the slurry pumping capacity since each unit can be filled from a common feed point or points. On the operating side, the step-by-step movement of the turntable from station to station, the corresponding opening and closing of the presses, and the opening and closing of the slurry valves, can all be effected automatically and labour kept down to the minimum necessary for supervision.

The invention is illustrated in the accompanying drawings, in which:

FIGURE 1 is a diagrammatic plan view and

FIGURE 2 a transverse section of a rotary press apparatus incorporating a series of filter presses together with an unloading runway providing a discharge station, on to and off which the plates of individual filter presses are drawn on completion of a filtering operation, FIGURE 3(A) and 3(B) are plan views showing a rotary press in accordance with a preferred embodiment of the invention, FIGURES 4(A) and 4(B) together constitute a side elevation of the apparatus shown in FIGURES 3 (A) and 3 (B), FIGURES 5, 6 and 7 are respectively part plan, side elevation and end-on views on an enlarged scale showing the end portion of a filter press beam on the turntable by which the press units are aligned with the runway of the unloading station, FIGURES 8 and 9 are respectively a fragmentary plan and elevation showing a ram and its mounting by which drive is imparted to the turntable, FIGURES 10 and 11 are detail views, FIGURE 10 showing two adjacent press plates interconnected by chain, FIGURE 11 being a section of a lug on the plate and the coupling chain, FIGURE 12 is a side elevation of the carriage locking mechanism, FIGURE 13 is an end-on view of the locking spider on the carriage and FIGURE 14 is a section on the line 14—14 of FIGURE 12 showing the spider on the casting end plate.

Referring first to FIGURES 1 and 2, 1 indicates generally a rotary turntable on which is mounted a number (in this case 12) of angularly spaced filter press units 2 which are arranged radially in relation to a central slurry tank 9.

Provision is made for imparting rotational movement to the turntable 1 so that the filter press units 2 may be successively advanced, following completion of a filtration operation, as hereinafter explained, to an unloading or discharge station or stations, at which the filter cake is discharged. Each discharge station, of which there are two, indicated at 3, 3' in FIGURES 1 and 2 comprises a runway 3", beneath which is a conveyor 4 so that individual plates of a filter press to be unloaded can be withdrawn by pulling them on to the runway 3″ where the plates are separated from one another to allow the solids (filter cake) to fall on to the conveyor 4.

It will be appreciated that by providing two such discharge stations or runways 3, 3′, it enables the filter cake from two press units to be discharged simultaneously on to the endless conveyor 4, which, in this case, extends diametrically across the entire width of the turntable and beneath the slurry tank 9, constituting a supply station.

Each runway 3″ comprises a gantry supported by uprights 5 on which is a self-propelled carriage 8 for pulling out the plates and returning them after unloading, a suitable ram, not shown, also being provided for applying the necessary pressure to close the plates of individual filter presses prior to refilling with slurry from the tank 9 and the subsequent filtration operation.

In accordance with standard practice, two pumps, one operating at low pressure (LP) and the other at high pressure (HP), are provided and are indicated respectively at 10 and 11.

In the first phase the empty press chambers are filled with slurry from the LP pump 10, which takes up slurry through a pipe 10′ that opens beneath the level of slurry in the tank 9, from whence it is fed into an outer pipe ring main 13, while the HP pump 11 similarly, through a pipe 11′, feeds slurry into a ring main 14.

Connections are made from each of the ring mains 13, 14 to the individual presses 2, through pipelines as shown, in which are automatically operating valves.

After filling the slurry at low pressure into the press chambers and expelling the air, the second phase of filling, using the HP pump 11 is started up, when more slurry is forced in under pressure and the liquid medium forced out through the filter cloths, leaving the solids (filter cake) inside the press chambers.

On conclusion of filtering, the residual slurry pressure is released and any remaining liquid slurry drains back to the main sump 9 prior to opening the press.

The carriage 8 is now advanced and after connecting up to the end plate of the filter press, the plates, which are interconnected by chains, are drawn onto the runway extension 3″. In this operation the plates are moved apart to release the filter cake which falls on to the conveyor 4. The carriage is then reversed to return the plates to their closed position on the press.

In order to advance the next filter press to the discharge station, the turntable is caused to rotate by means of rams 12.

Referring now to FIGURES 3(A), 3(B), 4(A) and 4(B), the turntable 1 is supported for rotary movements on a platform 16 provided with two sets of tracks, one for an outer set of rollers in the form of bogies 17 and the other for an inner set of bogies 18.

It will be seen that in FIGURES 3(A), 3(B), 4(A) and 4(B) the turntable is in the form of a decagon mounting ten filter presses 2 and consists of a framework built up from an outer ring 20 and an inner ring 21, the individual frame members which make up the two rings being interconnected by spoke members 23 at each angle and additional beam members 24 tangential to the inner ring for transmitting the drive. Each set of bogies 17, 18 has four wheels running on independent tracks and in the case of the outer set of bogies 17, laterally operating guide rollers 25 are fitted.

Each filter press comprises an overhead runway 30 provided by an I-section girder or beam from which the plates L, see FIGURE 3(B) are suspended by means of rollers R. The girder 30 is supported at its inner end on a press casting 31 which is directly supported by the inner bogies 18 while, at their outer ends, the beams 30 are carried by uprights 32 directly supported at their lower ends on the members 20 which make up the outer ring so that they are directly supported from the bogies 17. Therefore none of the weight of the presses is carried by the turntable itself, which only has to carry the weight of the walkways for personnel, indicated at 33, and ancillary pumping equipment.

A circular platform 34, accessible from a ladder 35 is also provided for a supervisor to observe and control operation of the individual presses.

Drive is imparted to the turntable by the rams 12, 12′, 12″ which are arranged in two sets, each set operating alternately with the other and having its own motor pump and valves but being controlled by a single unit as described hereinafter in connection with FIGURES 8–9.

At their inner ends, the ram cylinders are anchored by engagement with a thrust ring provided by a circular guide track 36 arranged between the inner and outer rails 17′, 18′ and from which thrust is transmitted through the ram pistons to straps 37 interconnecting adjacent pairs of ring sections 20 and beam members 23.

The runway at the discharge station comprises a gantry beam 40 supported by a series of portal frames 41, which straddle a conveyor belt 42 to receive the filter cake. On each side of the runway is a cat-walk 50 surmounted by a hand rail 51.

Mounted on the beam 40 is an operating carriage which, in plan, consists of a rectangular frame indicated generally at 43, having rollers 44 which run on suitable tracks on the beam 40 and from which is suspended a lower platform 46 mounting a pump 47 and associated motor for operating a press closing ram 48.

The runway carriage 43 is traversable in either direction along the gantry 40 by means of a power operated endless belt or chain drive 50′ supported at each end on pulleys 52, 52′, the pulley 52′ being attached to a bracket 53 on the endmost portal frame 41 and the pulley 52 on an upright on the runway, which also carries a drive motor 54. A bracket 55 on the carriage serves as the means of fixing it to the chain 50′ so that it can be moved in either direction, i.e., for withdrawing the plates from the filter press to an open position on the runway extension, four such plates being shown at L in FIGURE 3(B) in their open position, and for returning them from the runway extension to the press unit.

Since the ram 48 of the carriage 43 has to be withdrawn with the carriage after closing the plates, provision is made to hold the plates of each press in their closed or contact position and for this purpose each press comprises two end plates or castings, an inner casting 60 integral with the turntable structure and a radially outermost plate 61 which is suspended by rollers 62 from the press and gantry runways 30, 40.

On each press, and extending on each side of the press plates, are two tie rods 63 together with an overhead tie rod 64, which tie rods are anchored at their inner ends to the casting 60 and in conjunction with the outer casting 61 serve as a clamp for holding the plates in contact with one another and under pressure.

As can be seen from FIGURE 3(B), locking means as hereinafter described with reference to FIGURES 12, 13 and 14 is provided:

(1) to secure the outer end casting 61 to the tie rods 63, 64, and (2) when the carriage 43 has moved to the end of the runway extension next the turntable, to lock the same to the tie rods so that it is held against the thrust set up by the ram (or rams) when the latter is or are operated to apply closing pressure to the end casting 61 and thus to the filter plates and (3) to enable the carriage to be interlocked with the end casting 61 when the latter, together with the filter plates, is withdrawn on to the runway extension to open up the filter plates.

A pressure gauge (not shown) may be fitted to ensure that the necessary pressure has been attained at the moment of locking the press casting end plate 61 to the tie rods; means is also provided for adjusting the effective length of the rods to enable the final closing pressure to be set as required.

In one such arrangement additional collars or shims 65 may be placed on the rods 63, 64.

As described above, individual filter plates are interconnected by chains, of which conveniently there are upper and lower runs, for which purpose each plate is provided on opposite sides with upper and lower lugs, the upper set of lugs being indicated at 67 in FIGURES 10, 11.

The chains are anchored at their ends by means of eyelets 68 to the upper and lower lugs on each side of the plates and in order to afford a cushioning action the chain anchorages are made resilient by providing the eyelets 68 at the ends of each chain with a bush 69 of resilient material, e.g., rubber.

*Turntable rotating means*

The hydraulic rams 12 for rotating the turntable are arranged in two sets or groups, each group comprising three rams, of which those in one group are indicated at 12, 12′ and 12″ in FIGURES 3 and 4, the two groups being arranged on opposite sides of the turntable with cooperating rams in each group diametrically opposite one another. The rams in the two groups are synchronized so that a pair of rams, one in each group, operate simultaneously, the ram 12, to the right of the figure in FIGURE 3(A), being shown extended with the other two rams 12′, 12″ being closed up, i.e., the rams fully withdrawn.

Referring now to FIGURES 8 and 9, each of the rams 12, 12′, 12″ comprises a cylinder element 70 having an eye 71 connected through a universal joint 72 to a stud carried by a depending arm 73 on the turntable, the universal joint permitting relative vertical and horizontal movements.

It will be seen that the rams are inclined to the horizontal and the elements 70a at their lower ends, are connected through a pivot pin 74 carried by a fork forming part of a block 75 which is freely slidable in the track 36 which is of channel section and extends in a circle between the tracks carrying the inner and outer sets of bogies, 18, 17.

Spaced at regular intervals around the perimeter of the thrust ring track 36 are thrust seatings or pads, each consisting of two plates 76, which are adjustably secured by means of set screws 77 and slots 78 in the plates to the sides of the channel track.

Each plate 76 at its rear end is formed with a web 79 to receive one end of an adjusting screw 80, whose other end extends through a hole in a U-shaped bracket 81 fast on the side wall of the channel, adjustment being effected by nuts threaded on the studs 80.

At their forward ends the plates 76 are cut away to form a recess to receive trunnion rollers 82 attached to opposite sides of the blocks 75.

It will be seen that the recesses include a curved portion and are reinforced with strips 83 of hard metal, the strips 83 being further supported by means of gussets 84 on the pads 76.

In advance of each pair of thrust pads or plates 76, the side walls of the channel track are cut away on an incline which merges with the horizontal portions of the strips 83 so as to allow the rollers 82 to drop down into engagement with the recesses as the blocks move along the channel prior to the operation (extension) of each ram.

In operation as each pair of rams, one in each group, is brought into operation, the pistons carrying the rollers 82 will thrust against the thrust pads 76 to impart a rotational movement to the turntable carrying the filter presses. When one pair of rams (one in each group) is fully extended, the next ram 12′ and its counterpart (not shown) comes into operation and as it extends, continues the rotational movement of the turntable. The same applies to the third ram 12″. When all three rams in each group have been extended, the rams are retracted (simultaneously) while the turntable remains stationary.

By arranging for the three rams to be at an angular spacing approximately equal to a third of the angular spacing of the filter presses, which in this case are nine degrees apart, the consecutive action of the three rams 12, 12′, 12″ and their counterparts in the other group will move the presses in turn into a position opposite the discharge station.

*Press and runway extension track guide aligning mechanism*

Since the position of the beams 30 on the turntable, which carry the press plates of individual press units will never be precisely the same either in a vertical or a horizontal plane, when the turntable stops for unloading, provision is made for effecting automatic alignment. The end of the overhead beam 40 of the unloading station is therefore made capable of limited movement both vertically and horizontally so that it can exactly line up with the runway beams of individual filter press units on the turntable.

The end of the unloading beams includes a part 400 (FIGURE 6) hinged to the fixed part 40 by two hinges allowing respectively horizontal and vertical movement. When not engaged by the turntable beam, the part 400 is held, both in its highest vertical position and in its position furthest towards the direction from which the turntable beam B will approach, by a wire rope 85 which, after passing around pulleys 86 and 87 carried on brackets, is attached at its end to a counterweight 89.

The rail part 400 is mounted to swivel about a vertical hinge pin 91, the pin 91 in turn being pivotally carried on a horizntoal fulcrum 92 carried by a bracket 93 secured to the underside of guide beam 40.

When shortly before the turntable comes to rest and the end of the guide beam, indicated at B (FIGURE 6), on the press is in line in a horizontal plane with the hinged beam part 400, a plate 90 (FIGURE 5), fixed on the side of B, comes into contact with the side of part 400 and turns it about the hinge pin 91 (against the force of the counterweight) so that when the turntable shortly stops the rails are in line in a horizontal plane.

The unloading carriage 43 is now moved towards the turntable and when it reaches the hinged rail part 400 the latter is depressed (against the action of the counterweight) until it rests on a second stop plate 90′ fixed to the bottom of rail B and a plate 94, fixed to the top of the hinged rail 400, is in contact with the top of the turntable rail B. While this has been taking place, the edge of the plate 94 has been in contact with the sloping face of a catch 95 hinged in a bracket 96 on beam B and has pushed it toward the turntable. When plate 94 has reached the position shown the catch 95, which is out of balance (i.e., gravity operated to return position) on its hinge, swings away from the turntable and engages the plate 94 in the position shown on the drawings. This prevents the hinged rail 400 from rising when the carriage has passed it, and the rails are now both vertically and horizontally aligned.

Because there will always be a gap between the end of rails B and 400 to allow for expansion and unavoidable inaccuracies, the lower flanges of these rails are cut with a joggle where they abut so that a continuous rail is provided for the rollers of the carriage and press.

When the turntable again rotates, plate 90 pushes the hinged rail 400 round until plate 90 can pass its end. When this happens rail 400 swings back under the action of the counterweight and is ready for another unloading cycle.

*Carriage ram and press end plate interlocking mechanism*

Referring now to FIGURES 12–14, the locking means is provided by two spiders indicated generally at S1 and S2. Spider member S1 consists of three arms, each formed from two angle section strips 105 between the flanges of which are secured plates 107, the spider unit as a whole being mounted to swivel about a hinge pin 106 fast on the face of the end plate or casting 61.

Control of the spider S1 is by means of a handle 116 by which it is manually operated to bring one or other of two sets of latches into the form of slots in use; an outer set of slots 108, for co-operation with collars 109 on the tie rods 63, 64, and an inner set 117 for co-operation with collars 118 on the ram pistons, of which there are three, indicated at 103.

The slots 108 which have curved entrance sides 108' to facilitate interengagement with the tie rods 63 and 64, are brought into operation by clockwise rotation of the spider as seen in FIGURE 14, i.e., looking in direction of arrow x (FIGURE 12).

It will be clear that when the slots 108 in the ends of each of the plates carried by the spider arms are engaged behind the collars 109, the end plate 61 is held against axial movement lengthwise of the tie rods 63, 64 so that pressure can be maintained in the filter plates.

On anticlockwise movement of the spider S1, the inner set of slots 117 will engage behind the collars 118 provided on the ram pistons. In this position of the spider S1 the carriage will be locked to the end plate 61 so that on reversal of the carriage along the runway (direction arrow y—FIGURE 4(B)), the filter plates can be withdrawn.

Spider member S2, which is mounted to swivel about a pivot 113 on the end part 104 of the carriage 43, consists of three arms 112 (FIGURE 13), which are of cranked formation to provide clearance for the cylinders 103a of rams 103, each arm having at its end a plate in which is a slotted member 114 for engagement with a second set of collars 115 on the tie rods 63 and 64 respectively.

It follows that when spider S2 is brought into operation by clockwise rotation (handle 114a being provided for this purpose) the carriage 43 will be held to the tie rods and the collars 115 will take the thrust when the ram pistons 103 are extended to apply closing pressure to the filter plates.

In operation, when it is desired to close a press, whose filter plates, together with the end casting 61, have been discharged from a position on the runway, the procedure is as follows:

The pistons 103 are retracted and the carriage 43 is at that end of the runway bay girder 40 distant from the turntable. The carriage is now moved towards the turntable. The pistons 103 are brought into use to push the end plate 61 towards the turntable and the end plate in turn pushes the filter plates one against the other and then all together on to the turntable until the tie rods 63, 64 protrude through holes in the front part of the carriage 43 as at 111 on the side distant from the turntable.

Clockwise rotation of the spider S2 on the end part 104 of the carriage by means of the handle 114a causes the slotted plates 114 to engage the collars 115 on the tie rods 63, 64. The drawing (FIGURE 13) shows these plates in the engaged position. The pistons 103 are then extended by hydraulic pressure and act on the end plate 61 to squeeze the filter plates together until the end plate 61 can be locked to the tie rods 63, 64 by rotating the spider S1 in a clockwise direction by means of the handle 116 until the slots 108 engage the collars 109 on the tie rods. The reaction from the thrust of the rams 103 while squeezing is taken by the tie rods 63, 64 to which the carriage and rams 103 are locked by spider S2.

To allow the turntable to rotate and to prepare for opening the next press the carriage end part 104 is unlatched from the tie rods by anticlockwise rotation of the spider S2 and the carriage moved away from the turntable.

To open the (next) press the carriage part 104 is moved towards the turntable and latched to the ends of the tie rods by clockwise rotation of the spider S2. The pistons 103 are then a little further extended by hydraulic pressure to take the load off the latching plates 107. The latter are then disengaged from the tie rods 63, 64 by anticlockwise rotation of the spider S1. At the same time slots 117 also in plate 107 engage on the side distant from the centre of the turntable the collars 118 on the pistons 103. The carriage 104 is then unlatched from the tie rods 63, 64 by anticlockwise rotation of the spider S2 and is moved away from the turntable through the pistons 103, which are now latched to the end plate 61 of the press pulling it and the rest of the filter plates in turn off the turntabe on to the rail 40 of the runway extension.

To provide for adjustment of the collars 109 and 115, these are retained in position on the tie rods by nuts 110, 110a.

As shown in FIGURE 1 to enable a defective press to be exchanged without bringing the cycle to a standstill two additional runway extensions 135, 136 (FIGURE 1) may be provided, one to carry a spare set of press plates and the other to receive a defective set.

The runway extensions 135, 136 may be aligned with any two stations to suit the site layout, each being fitted with a winch and cable for pulling the filter plates off and returning them to the turntable.

What is claimed is:

1. A rotary filter press apparatus comprising a substantially circular rotatably mounted turntable; a series of angularly spaced filter press units carried by said turntable, each filter press unit including a first track guide means supported on said turntable and extending radially in relation to the turntable with the outer ends of each of said first track guide means lying at the circumference of a circle whose center coincides with that of said turntable, and a plurality of filter plates including a radially outermost filter plate mounted on each of said first track guide means for movement radially thereon in relation to said turntable; a stationary runway extension adjacent the turntable including further track guide means radially extending with respect to the center of the turntable with the inner end of said further track guide means lying at the circumference of the same said circle, said further track guide means on said stationary runway extension and the first track guide means on one of said filter press units being aligned to form a continuous track when said filter press unit is in a predetermined position opposite said stationary runway extension; means for imparting rotary movement to said turntable to advance said filter press units successively to said position wherein successive ones of said first track guide means are successively aligned with said further track guide means; operating means mounted on said stationary runway extension and being connectable to said outermost filter plate for withdrawing the filter plates from the first track guide means of an aligned filter press unit onto said further track guide means of said stationary runway extension and for returning said filter plates to the first track guide means on the aligned filter press unit; a central slurry supply means; and pipe connections between individual filter press units and said central slurry supply means.

2. A filter press apparatus according to claim 1 in which said operating means comprises a carriage mounted on said further track guide means for movement therealong; and means on said carriage connectable to the outermost filter plate of an aligned filter press unit in said predetermined position, said carriage being movable to two positions, namely: a position at the inner end of said further track guide means when the filter plates of said first track guide means are closed together on said first track guide means of said aligned filter press unit, and a position at the outer end of said further track guide means in which the filter plates of said aligned filter press unit are spaced apart on said further track guide means.

3. A filter press apparatus according to claim 2 comprising a ram carried by means including said stationary runway extension and being operable in a line parallel to said further track guide means; and means for connecting said ram to the outermost filter plate of an aligned filter press unit in said predetermined position, said ram being extensible toward the center of said circle for pressing said filter plates tightly together on said first track guide means.

4. A filter press apparatus according to claim 3 in which said ram is mounted on said carriage, said apparatus including, on each of said filter press units, means for retaining the filter plates thereof in the tightly pressed-together condition effected by extension of said ram.

5. A rotary filter press apparatus comprising a substantially circular rotatably mounted turntable; a series of angularly spaced filter press units carried by said turntable, each filter press unit including a first track guide means supported on said turntable and extending radially in relation to the turntable with the outer ends of each of said first track guide means lying at the circumference of a circle whose center coincides with that of said turntable, and a plurality of filter plates and a radially outermost plate mounted on each of said first track guide means for movement radially thereon in relation to said turntable; a stationary runway extension adjacent the turntable including further track guide means radially extending with respect to the center of the turntable with the inner end of said further track guide means lying at the circumference of the same said circle, said further track guide means on said stationary runway extension and the first track guide means on one of said filter press units being aligned to form a continuous track when said filter press unit is in a predetermined position opposite said stationary runway extension; means for imparting rotary movement to said turntable to advance said filter press units successively to said position wherein successive ones of said first track guide means are successively aligned with said further track guide means; a carriage mounted on said further track guide means for movement in both radial directions therealong; means for interlocking said carriage to the radially outermost plate of an aligned filter press unit in said predetermined position, said carriage being movable along said further track guide means in said both radial directions for moving the filter press plates of said aligned filter press unit to closed positions relatively to one another and to relatively open positions on said further track guide means; a slurry charging container; and means for delivering slurry from said container to said filter press units.

6. A filter press apparatus according to claim 5 wherein said turntable comprises a framework including an inner ring and an outer ring, said apparatus further including circular track means below, spaced apart from and concentric with said turntable; and wheeled bogies supporting said framework and having rolling engagement with said track means.

7. A filter press apparatus according to claim 6 in which said track means includes inner and outer circular tracks concentric with said turntable and in which said bogies include an inner series of bogies engaging said inner circular track and an outer series of bogies engaging said outer circular track, said apparatus further including guide rollers on said bogies engaging the sides of said circular tracks for guiding said bogies and turntable laterally.

8. A filter press apparatus according to claim 5 in which the means for imparting rotary movement to said turntable comprises a thrust ring concentric with said turntable; and a plurality of rams each including two relatively extensible elements, one of said elements of each of said rams being connected to said turntable, and the other of said elements of each of said rams being thrust-engageable with said thrust ring.

9. A filter press apparatus according to claim 5 in which said turntable comprises inner and outer concentric rings of frame members and radially extending frame members interconnecting said inner and outer rings at spaced intervals, and in which said means for imparting rotary movement to said turntable comprises a plurality of rams mounted in two groups on radially opposite sides of the center of said turntable.

10. A filter press apparatus according to claim 5 in which each of said filter press units comprises at least two tie rods extending parallel to the associated first track guide means and in which the plates of each filter press unit have apertures through which the associated tie rods extend, each of said filter press units including linking means interconnecting the plates thereof, said apparatus further including other interlocking means for interlocking the radially outermost plate of an aligned filter press unit with the associated tie rods when said filter plates are in said relatively closed positions.

11. A filter press apparatus according to claim 10 in which said other interlocking means comprises, in each of said filter press units, a member mounted on said outermost plate for rotation in one direction into interlocking engagement with the associated tie rods and in the reverse direction for interlocking connection with said carriage.

12. A filter press apparatus according to claim 5 in which each of said filter press units comprises at least two tie rods extending parallel to the associated first track guide means and in which the plates of each filter press unit have apertures through which the associated tie rods extend, said apparatus further including ram means for pressing the filter plates of an aligned press unit to their closed position; and means on said carriage operable when said carriage is at the radially inner end of said further track guide means for locking said carriage to said tie rods during operation of said ram.

13. A filter press apparatus according to claim 12 in which said ram means is supported on said carriage and comprises at least two extensible pistons operable on said filter plates of the aligned filter press unit through said radially outermost plate, said apparatus further including power operated means for moving said carriage along said further track guide means in both radial directions.

14. A filter press apparatus according to claim 13 in which said ram pistons and said tie rods are provided with collars, and in which said means on said carriage for locking said carriage to said tie rods comprises a spider rotatably mounted on said carriage and being interlockingly engageable with collars on said tie rods, said apparatus further including a second spider rotatably mounted on said radially outermost plate and being selectively interlockingly engageable with collars on said ram pistons and collars on said tie rods.

References Cited by the Examiner

UNITED STATES PATENTS

| 1,003,259 | 9/11 | Hill _____ | 210—241 X |
|---|---|---|---|
| 1,386,165 | 8/21 | Danks _____ | 210—241 X |
| 1,749,080 | 3/30 | Mathers _____ | 210—224 |
| 2,050,007 | 8/36 | Keith et al. _____ | 210—396 X |
| 2,843,267 | 7/58 | Anderson _____ | 210—236 |
| 2,916,143 | 12/59 | McConaloque _____ | 210—236 |
| 2,936,075 | 5/60 | Davis _____ | 210—236 |
| 2,975,903 | 3/61 | Ulrich _____ | 210—236 |

FOREIGN PATENTS 919,587  10/54  Germany.

OTHER REFERENCES

"Sperry Handraulic Closing Device," D. R. Sperry and Company, Batavia, Ill., 4 pp.

REUBEN FRIEDMAN, *Primary Examiner.*

ROBERT E. BURNETT, *Examiner.*